United States Patent
Hashimoto et al.

(10) Patent No.: US 12,027,060 B2
(45) Date of Patent: Jul. 2, 2024

(54) DATA GENERATION DEVICE, METHOD OF GENERATING DATA, AND REMOTE MANIPULATION SYSTEM

(71) Applicant: KAWASAKI JUKOGYO KABUSHIKI KAISHA, Hyogo (JP)

(72) Inventors: Yasuhiko Hashimoto, Kobe (JP); Masayuki Kamon, Akashi (JP); Shigetsugu Tanaka, Akashi (JP); Yoshihiko Maruyama, Osaka (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 635 days.

(21) Appl. No.: 17/267,288

(22) PCT Filed: Aug. 8, 2019

(86) PCT No.: PCT/JP2019/031495
§ 371 (c)(1),
(2) Date: Feb. 9, 2021

(87) PCT Pub. No.: WO2020/032211
PCT Pub. Date: Feb. 13, 2020

(65) Prior Publication Data
US 2021/0316461 A1   Oct. 14, 2021

(30) Foreign Application Priority Data

Aug. 10, 2018   (JP) .................................. 2018-151917
Jun. 5, 2019   (JP) .................................. 2019-105754

(51) Int. Cl.
*B25J 9/16*   (2006.01)
*A63F 13/25*   (2014.01)
(Continued)

(52) U.S. Cl.
CPC .............. *G09B 19/00* (2013.01); *A63F 13/25* (2014.09); *A63F 13/50* (2014.09); *A63F 13/67* (2014.09);
(Continued)

(58) Field of Classification Search
CPC .......... G09B 19/00; G09B 5/02; G09B 19/16; G09B 19/24; G09B 9/00; A63F 13/25;
(Continued)

(56) References Cited

U.S. PATENT DOCUMENTS 5,046,022 A * 9/1991 Conway .................. B25J 9/1689
700/250
2015/0057801 A1 * 2/2015 Stephens, Jr. .......... B25J 9/1689
901/1
(Continued)

FOREIGN PATENT DOCUMENTS

JP   2014-229157 A   12/2014
JP   2015-047666   3/2015
(Continued)

OTHER PUBLICATIONS

Kosuge, Kazuhiro, "Teleoperation via Computer Network Using Environmental Predictive Display", Journal of Robotics Society of Japan), May 15, 1999, vol. 17, No. 4, pp. 473-476.

*Primary Examiner* — Abby Y Lin
*Assistant Examiner* — Dylan M Katz
(74) *Attorney, Agent, or Firm* — Studebaker & Brackett PC (57) ABSTRACT

A data generation device generates at least a part of data used for a generation of an image displayed on a display unit. The display unit displays a workspace model modeled after an actual workspace, as a video. The workspace model includes a robot model modeled after an actual robot, and a peripheral object model modeled after a given peripheral (Continued)

object around the actual robot. The robot model is created so as to operate according to operation of an operator to a manipulator. The data generation device includes a state information acquiring module configured to acquire state information indicative of a state of the peripheral object, and an estimating module configured to estimate, based on the state information, a state of the peripheral object after a given period of time from the current time point, and generate a result of the estimation as peripheral-object model data used for a creation of the peripheral object model displayed on the display unit.

13 Claims, 7 Drawing Sheets (51) Int. Cl.
| | |
|---|---|
| A63F 13/50 | (2014.01) |
| A63F 13/67 | (2014.01) |
| B25J 9/00 | (2006.01) |
| B25J 13/00 | (2006.01) |
| B25J 13/02 | (2006.01) |
| B25J 13/06 | (2006.01) |
| B25J 13/08 | (2006.01) |
| B25J 19/02 | (2006.01) |
| G09B 19/00 | (2006.01) |

(52) U.S. Cl.
CPC ........... *B25J 9/0081* (2013.01); *B25J 9/1605* (2013.01); *B25J 9/161* (2013.01); *B25J 9/163* (2013.01); *B25J 9/1661* (2013.01); *B25J 9/1671* (2013.01); *B25J 9/1689* (2013.01); *B25J 9/1697* (2013.01); *B25J 13/006* (2013.01); *B25J 13/02* (2013.01); *B25J 13/06* (2013.01); *B25J 13/065* (2013.01); *B25J 13/082* (2013.01); *B25J 13/088* (2013.01); *B25J 19/021* (2013.01)

(58) Field of Classification Search
CPC ......... A63F 13/50; A63F 13/67; B25J 9/0081;
B25J 9/1605; B25J 9/161; B25J 9/163;
B25J 9/1661; B25J 9/1671; B25J 9/1689;
B25J 9/1697; B25J 13/006; B25J 13/02;
B25J 13/06; B25J 13/065; B25J 13/082;
B25J 13/088; B25J 19/021; B25J 9/1656;
B25J 19/00; G05B 19/423; G06N 20/00
See application file for complete search history.

(56) References Cited

U.S. PATENT DOCUMENTS

| | | | |
|---|---|---|---|
| 2015/0117466 A1* | 4/2015 | Summer | H04L 43/0852 |
| | | | 370/465 |
| 2015/0314440 A1 | 11/2015 | Parker | |
| 2015/0378000 A1* | 12/2015 | Bar David | G06V 10/24 |
| | | | 348/169 |
| 2015/0379171 A1 | 12/2015 | Kuwahara | |
| 2018/0126554 A1* | 5/2018 | Eickhorst | B25J 9/1676 |
| 2018/0250821 A1* | 9/2018 | Shimodaira | B25J 9/1697 |
| 2018/0257240 A1 | 9/2018 | Hashimoto et al. | |
| 2020/0306974 A1* | 10/2020 | Fattey | B25J 9/161 |
| 2022/0050454 A1* | 2/2022 | Lacaze | G05D 1/0212 |

FOREIGN PATENT DOCUMENTS

| | | |
|---|---|---|
| JP | 2017-056529 A | 3/2017 |
| JP | 2017-519644 A | 7/2017 |
| KR | 10-2016-0002329 A | 1/2016 |
| TW | 201707880 A | 3/2017 |

\* cited by examiner

DATA GENERATION DEVICE, METHOD OF GENERATING DATA, AND REMOTE MANIPULATION SYSTEM

TECHNICAL FIELD

The present disclosure relates to a data generation device, a method of generating data, and a remote manipulation system.

BACKGROUND ART

Conventionally, systems in which an operator remotely manipulates a robot placed at a remote location through a network are known. In this kind of system, a communication delay may occur between a manipulation device operated by the operator and a robot. For example, Patent Document 1 discloses a remote manipulation system which can grasp a communication delay between a slave device and a master device.

The remote manipulation system disclosed in Patent Document 1 is provided with the master device and the slave device. The slave device is provided with a slave robot which operates according to manipulation information corresponding to operation by the operator, which is sent from the master device. The slave robot has an imaging device which images own work environment, and the slave device sequentially images the work environment and transmits the imaged actual image to the master device. The master device is provided with a simulator which performs an operation simulation based on the manipulation information sent to the slave robot, and generates a display image by systhesizing the actual image sent from the slave device and a simulation image obtained by the operation simulation. A ratio of synthesis between the actual image and the simulation image in the display image varies according to the communication delay between the master device and the slave device. In detail, when the communication delay is larger, the display image is generated such that the ratio of the simulation image increases. Although the actual image is an image including a background of the work environment, etc., as well as a state of the slave robot, the simulation image is an image only indicating the state of the slave robot. Therefore, the operator can easily grasp a degree of communication delay based on, for example, whether the background of the work environment is displayed in a deeper color in the display image.

REFERENCE DOCUMENT OF CONVENTIONAL ART

Patent Document

[Patent Document 1] JP2015-047666A

DESCRIPTION OF THE DISCLOSURE

Problem to be Solved by the Disclosure

However, according to Patent Document 1, the operator is required to determine the degree of communication delay based on the ratio of synthesis between the actual image and the simulation image, and when the communication delay is determined to be larger, he/she needs to suitably take a measure, such as reducing an amount of manipulation given to the master device. Therefore, in this system, the operator is required to assess the situation accompanying the communication delay as well as to manipulate the robot, and thus, the operator may not be able to concentrate on the manipulation of the robot.

Therefore, one purpose of the present disclosure is to provide a data generation device, a method of generating data, and a remote manipulation system, which can reduce an influence on manipulation performed by an operator caused by a communication delay between a manipulation terminal operated by the operator and a robot.

SUMMARY OF THE DISCLOSURE

In order to solve the above problem, a data generation device according to one aspect of the present disclosure generates, in a remote manipulation system including a manipulation terminal having a manipulator configured to accept operation of an operator and a display unit visually recognizable by the operator, and an actual robot placed in an actual workspace and connected with the manipulation terminal through a network in which data communication is possible, at least a part of data used for a generation of an image displayed on the display unit. The display unit displays a workspace model modeled after the actual workspace, as a video (time-varying image). The workspace model includes a robot model modeled after the actual robot, and a peripheral object model modeled after an actual peripheral object around the actual robot. The robot model is created so as to operate according to the operation of the operator to the manipulator. The data generation device includes a state information acquiring module configured to acquire state information indicative of a state of the actual peripheral object, and an estimating module configured to estimate, based on the state information, a state of the actual peripheral object after a given period of time from the current time point, and generate a result of the estimation as peripheral-object model data used for a creation of the peripheral object model displayed on the display unit.

When a communication delay occurs between the manipulation terminal and the actual robot, a deviation may occur between the operation of the robot model and the operation of the actual robot at the same time point, due to a time lag from the manipulation by the operator through the manipulation terminal to the operation performed by the actual robot corresponding to the manipulation. According to this configuration, the state of the actual peripheral object after the given time period from the current time point is estimated, and the estimated result is generated as the peripheral-object model data used for the creation of the peripheral object model displayed on the display unit. Therefore, the time lag can also be generated between the state of the peripheral object model and the state of the actual peripheral object, by the same amount as between the robot model and the actual robot. Accordingly, since a time axis of the robot model can be consistent with a time axis of the peripheral object model, the influence of the communication delay given to the manipulation of the operator can be reduced.

The actual peripheral object may include at least one of a workpiece that is a work target object of the actual robot, a transferring device configured to transfer the workpiece, and a moving device configured to move the actual robot.

The state information may include image information generated by an imaging device installed in the workspace capturing the actual peripheral object.

The state information may include setting information set for a peripheral device as the peripheral object.

The data generation device may further include a deviation detecting module configured to detect an amount of deviation between a situation in the workspace model displayed on the display unit at a given time point, and a situation in the actual workspace after the given period of time from the given time point. For example, when the deviation detected by the deviation detecting module is larger than a given value, the work of the actual robot may be suspended or the model displayed on the display unit may be corrected.

When the deviation detected by the deviation detecting module exceeds a range set in advance, the data generation device may further include a model correcting module configured to correct the workspace model so as to eliminate the deviation.

The manipulation terminal may be a game device including a controller as the manipulator.

The manipulation terminal may be at least one of a personal data assistant (PDA), a smartphone, a personal computer, a tablet, and a remote manipulator dedicated for a robot.

Moreover, a method of generating data according to another aspect of the present disclosure is a method for generating, in a remote manipulation system including a manipulation terminal having a manipulator configured to accept operation of an operator and a display unit visually recognizable by the operator, and an actual robot placed in an actual workspace and connected with the manipulation terminal through a network in which data communication is possible, at least a part of data used for a generation of an image displayed on the display unit. The display unit displays a workspace model modeled after the actual workspace, as a video. The workspace model includes a robot model modeled after the actual robot, and a peripheral object model modeled after an actual peripheral object around the actual robot. The robot model is created so as to operate according to the operation of the operator to the manipulator. The method includes the steps of acquiring state information indicative of a state of the actual peripheral object, and estimating, based on the state information, a state of the actual peripheral object after a given period of time from the current time point, and generating a result of the estimation as peripheral-object model data used for a creation of the peripheral object model displayed on the display unit.

Moreover, a data generation program according to another aspect of the present disclosure is executed by a computer to generate, in a remote manipulation system including a manipulation terminal having a manipulator configured to accept operation of an operator and a display unit visually recognizable by the operator, and an actual robot placed in an actual workspace and connected with the manipulation terminal through a network in which data communication is possible, at least a part of data used for a generation of an image displayed on the display unit. The display unit displays a workspace model modeled after the actual workspace, as a video. The workspace model includes a robot model modeled after the actual robot, and a peripheral object model modeled after an actual peripheral object around the actual robot. The robot model is generated by the operation of the operator to the manipulator. The program causes the computer to execute processings including acquiring state information indicative of a state of the actual peripheral object, and estimating, based on the state information, a state of the actual peripheral object after a given period of time from the current time point, and generating a result of the estimation as peripheral-object model data used for a creation of the peripheral object model displayed on the display unit. The program causes the computer to execute processings including acquiring state information indicative of a state of the actual peripheral object, and estimating, based on the state information, a state of the actual peripheral object after the current time point, and generating a result of the estimation as peripheral-object model data used for a creation of the peripheral object model displayed on the display unit.

Note that the data generation program is stored in a storage device. The storage device is a readable and writable or a readable device which is built in or externally attached to the computer, and it may be, for example, a hard disk, a flash memory, or an optical disc. The program stored in the storage device may be executed by the computer to which the storage device is directly connected, or may be executed by being downloaded by the computer connected to the storage device through the network (e.g., the Internet).

Moreover, a remote manipulation system according to another aspect of the present disclosure includes a manipulation terminal having a manipulator configured to accept operation of an operator and a display unit visually recognizable by the operator, and an actual robot placed in an actual workspace and connected with the manipulation terminal through a network in which data communication is possible. The display unit displays a workspace model modeled after the actual workspace, as a video. The workspace model includes a robot model modeled after the actual robot, and a peripheral object model modeled after an actual peripheral object around the actual robot. The robot model is created so as to operate according to the operation of the operator to the manipulator. The system includes a data generation device including a state information acquiring module configured to acquire state information indicative of a state of the actual peripheral object, and an estimating module configured to estimate, based on the state information, a state of the actual peripheral object after a given period of time from the current time point, and generate a result of the estimation as peripheral-object model data used for a creation of the peripheral object model displayed on the display unit.

Effect of the Disclosure

According to the present disclosure, an influence on manipulation performed by an operator caused by a communication delay between a manipulation terminal operated by the operator and a robot, can be reduced.

MODE FOR CARRYING OUT THE DISCLOSURE

Hereinafter, one embodiment of the present disclosure is described with reference to the accompanying drawings.
(Outline of System)

Figure 1:
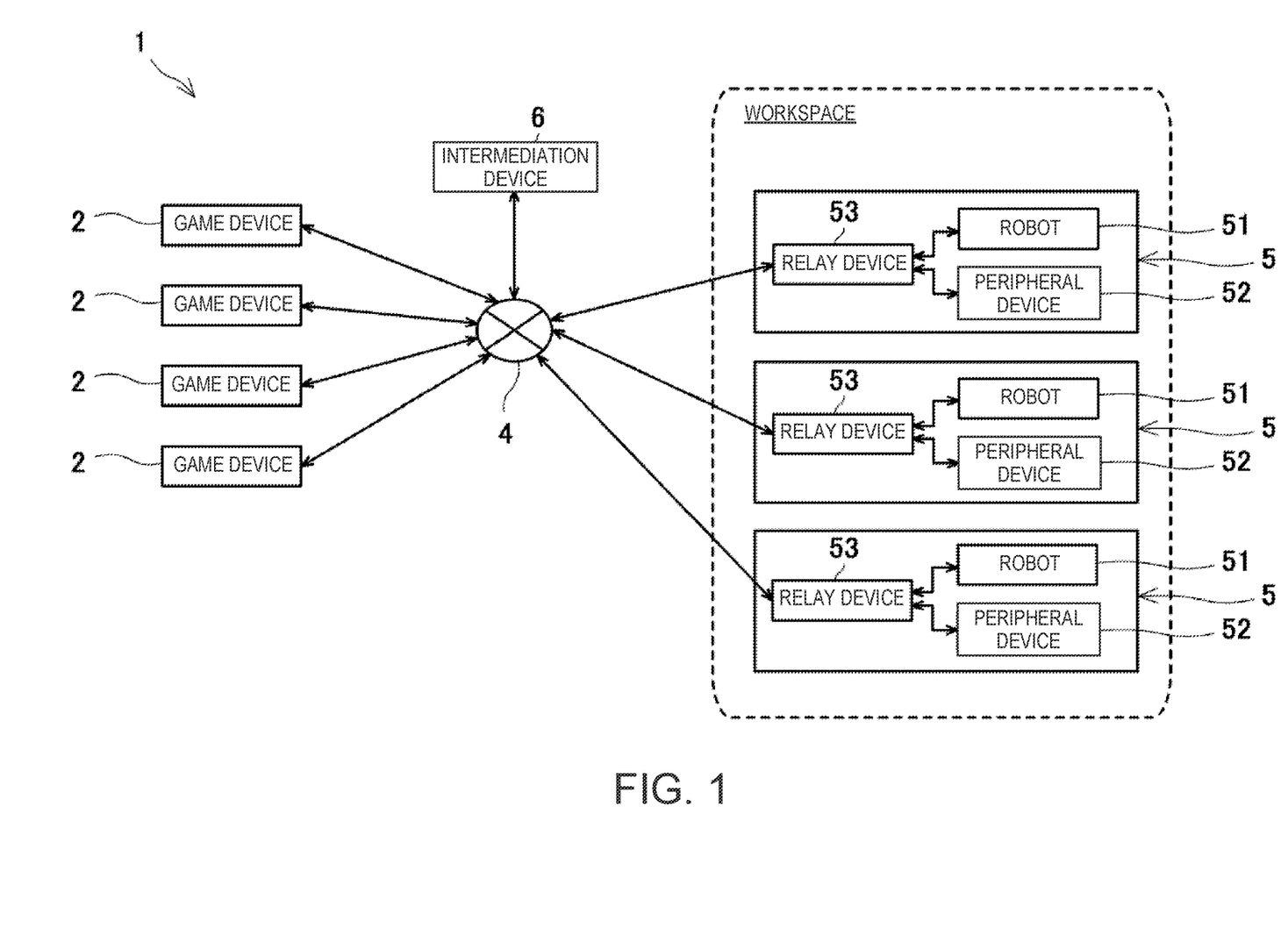
FIG. 1 is a block diagram illustrating the entire configuration of a remote manipulation system according to one embodiment of the present disclosure.

First, an outline of a remote manipulation system 1 according to this embodiment is described with reference to FIG. 1. FIG. 1 is a block diagram illustrating the entire configuration of the remote manipulation system 1.

The remote manipulation system 1 of this embodiment connects, via a communication network 4, one of various known game devices 2 (a manipulation terminal) to a robot 51 located at a remote worksite different from a place where an operator is located (a workspace, or hereinafter, may be referred to as an "actual workspace"). Then, the operator remotely manipulates the robot 51 using the game device 2 so that the robot 51 performs a given work.

The remote manipulation system 1 includes a plurality of game devices 2, one intermediation device 6, and a plurality of robot systems 5, which are mutually communicable via the communication network 4, such as the Internet. The game device 2 is, for example, a stationary-type game device placed at home of the operator, or a mobile game device carried around by the operator.

The robot system 5 is provided with a robot 51 which is a target of remote manipulation by the operator, one or more peripheral devices 52 placed around the robot 51, and a relay device 53. The robot 51, the peripheral device(s) 52, and the relay device 53 are all placed at the remote worksite separated from the place where the operator who operates the game device 2 exists. One or more robot systems 5 exist at the worksite.

Note that some or all of the plurality of robot systems 5 included in the remote manipulation system 1 may be installed at the same or different worksites. Moreover, the plurality of robot systems 5 installed at the same worksite may share one peripheral device 52. Note that although each of the plurality of robot systems 5 may include a plurality of peripheral devices 52 of the same or different kinds, in FIG. 1, only one block indicating the peripheral device 52 is illustrated per robot system 5 for simplification.

The relay device 53 is communicably connected to each of the robot 51 and the peripheral device 52 of the robot system 5 where the relay device 53 itself belongs. The relay device 53 sends information sent from the game device 2 or the intermediation device 6 to the robot 51 or the peripheral device 52, and sends information on the robot 51 or the peripheral device 52 to the game device 2 or the intermediation device 6.

The intermediation device 6 assigns one robot system 5 to one operator (one game device 2). In detail, the operator accesses the intermediation device 6 via the game device 2 so as to be registered as a user in advance, and a user ID is given to the operator in the user registration. When the operator inputs the own user ID to the game device 2 and sends an operation request to the intermediation device 6, the intermediation device 6, which received the operation request, associates the game device 2 with any of the robot systems 5, and communicably connects the game device 2 to the relay device 53 of the associated robot system 5 via the communication network 4.

For example, when the intermediation device 6 receives the operation request from the game device 2, the intermediation device 6 sends worklist information indicating a work content etc., to the game device 2. The operation request includes desired condition information inputted by the operator. The desired condition information includes some or all of a type of the robot, a work content of the robot, a target workpiece, an amount of work, a period of working time. When the intermediation device 6 receives the operation request, the intermediation device 6 filters works which match the condition desired by the operator based on the desired condition information included in the operation request, and sends a filtered worklist to the game device 2. When the operator specifies a desired one from the worklist displayed on a display device 25 of the game device 2, specification information corresponding to the specification by the operator is sent from the game device 2 to the intermediation device 6. The intermediation device 6 connects the game device 2 to the relay device 53 of the robot system 5 corresponding to the specification information.

As described above, according to the remote manipulation system 1, the operator can remotely manipulate the robot 51 located at various worksites physically separated from her/himself, by using the game device 2. For example, according to the remote manipulation system 1, the operator can manipulate the robot 51 located at a worksite at the other side of the world while staying at home. Between the game device 2 and the robot system 5 (in more detail, the robot 51) connected to each other, a communication delay may occur due to each communication environment of the game device 2 and the robot system 5, and a physical distance between the game device 2 and the robot system 5. As will be described later, this embodiment realizes the remote manipulation system 1 which reduces an influence on the manipulation by the operator caused by the communication delay between the game device 2 and the robot 51 connected to each other.

(Configuration of Hardware)

Figure 2:
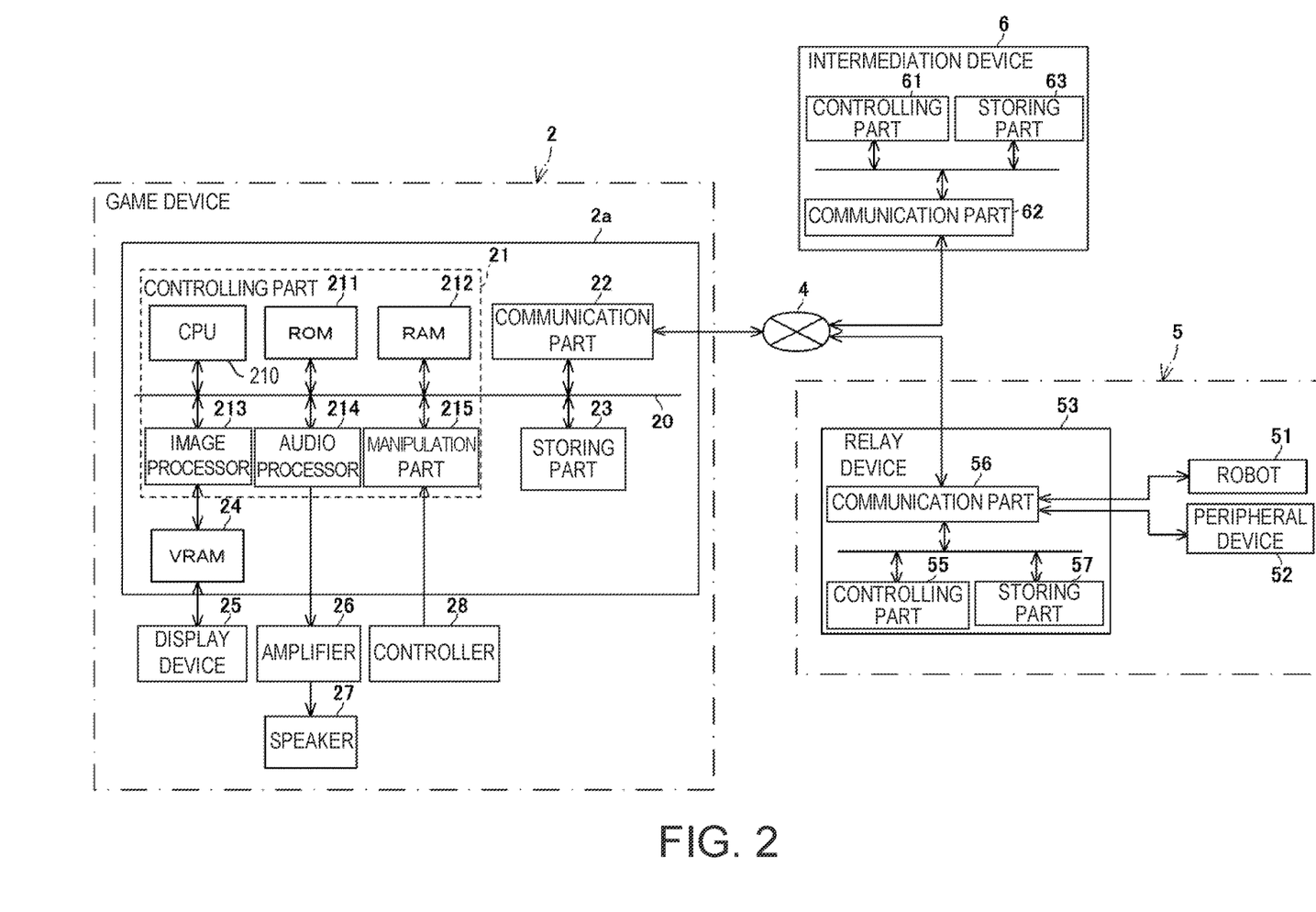
FIG. 2 is a block diagram illustrating one example of a hardware configuration of a game device, a relay device, and an intermediation device illustrated in FIG. 1.

FIG. 2 illustrates one example of a hardware configuration of the game device 2, the relay device 53, and the intermediation device 6. Note that FIG. 2 illustrates only one game device 2 of the plurality of game devices 2, and only one robot system 5 of the plurality of robot systems 5. The game device 2 is provided with a game device body 2a, and the display device 25 (a display unit), a speaker 27, and a controller 28 (a manipulator) connected to the game device body 2a.

As illustrated in FIG. 2, the game device body 2a is provided with, on a bus 20, a controlling part 21, a communication part 22, and a storing part 23, such as a hard disk and a memory card. The controlling part 21 generates manipulation information to be sent to the robot 51 via the communication network 4, based on operation to the controller 28. Note that the robot 51 operates based on this manipulation information. Moreover, the controlling part 21 generates an image to be displayed on the display device 25 based on the operation to the controller 28. The controlling part 21 is provided with a CPU 210, a ROM (a flash memory) 211, a RAM 212, an image processor 213, an audio processor 214, and a manipulation part 215.

The CPU 210 controls operation of each part of the game device 2. The ROM 211 stores a basic program etc., of the game device 2. The storing part 23 stores a remote manipulation program for operating the robot 51 by a remote manipulation, a game program for executing various games, etc. A working area, which is used when the CPU 210 executes the game program, is set for the RAM 212. Note that although in this embodiment the remote manipulation program is essential to be stored in the storing part 23, the storing of the game program is not essential. Note that, in the following description, the ROM 211 and the RAM 212 of the controlling part 21, and the storing part 23 which store the various programs and data are collectively referred to as a "storage device of the game device 2."

The image processor 213 is provided with a GPU (Graphics Processing Unit) which can generate a game screen. A video RAM (VRAM) 24 is connected to the image processor 213, and the display device 25 is connected to the VRAM 24.

The audio processor 214 is provided with a DSP (Digital Signal Processor) which generates game sound. The audio processor 214 transmits the generated game sound to an amplifier 26 including a D/A converter. The amplifier 26 amplifies this sound signal and transmits it to the speaker 27.

The controller 28 is wiredly or wirelessly connected to the manipulation part 215. The controller 28 includes a cross button, a push switch, a joystick, a mouse, a keyboard, and a touch panel. Moreover, the manipulation part 215 detects a signal of manipulation by a user via the controller 28, and transmits this manipulation signal to the CPU 210.

The communication part 22 is a communication device which communicates with the intermediation device 6 and the relay device 53 via the communication network 4.

The intermediation device 6 is provided with a controlling part 61, a communication part 62, and a storing part 63. The controlling part 61 is comprised of, for example, a processing unit having a processor and a memory. In detail, the processing unit is comprised of, for example, a microcontroller, an MPU, an FPGA (Field Programmable Gate Array), a PLC (Programmable Logic Controller), a computer, or a personal computer. The controlling part 61 may be comprised of a sole processing unit which executes a centralized control, or a plurality of processing units which execute a distributed control. The communication part 62 is a communication device which communicates with the game device 2 and the relay device 53 via the communication network 4. The storing part 63 is a readable and writable storage device or a readable storage device, and it may be, for example, a hard disk, a flash memory, or an optical disc. The controlling part 61 controls operation of each part of the intermediation device 6. The memory of the controlling part 61 and the storing part 63 store various programs and data for controlling the operation of the intermediation device 6, such as a program for associating the game device 2 with the robot system 5.

The relay device 53 is provided with a controlling part 55, a communication part 56, and a storing part 57. The controlling part 55 is comprised of, for example, a processing unit having a processor and a memory. In detail, the processing unit is comprised of, for example, a microcontroller, an MPU, an FPGA (Field Programmable Gate Array), a PLC (Programmable Logic Controller), a computer, or a personal computer. The controlling part 55 may be comprised of a sole processing unit which executes a centralized control, or a plurality of processing units which execute a distributed control. The communication part 56 is a communication device which communicates with the game device 2, the intermediation device 6, the robot 51, and the peripheral device 52 via the communication network 4. The storing part 57 is a readable and writable storage device or a readable storage device, and it may be, for example, a hard disk, a flash memory, or an optical disc. The controlling part 55 controls the operation of the relay device 53. The memory of the controlling part 55 and the storing part 57 store various programs and data for controlling the operation of the relay device 53.

Figure 3:
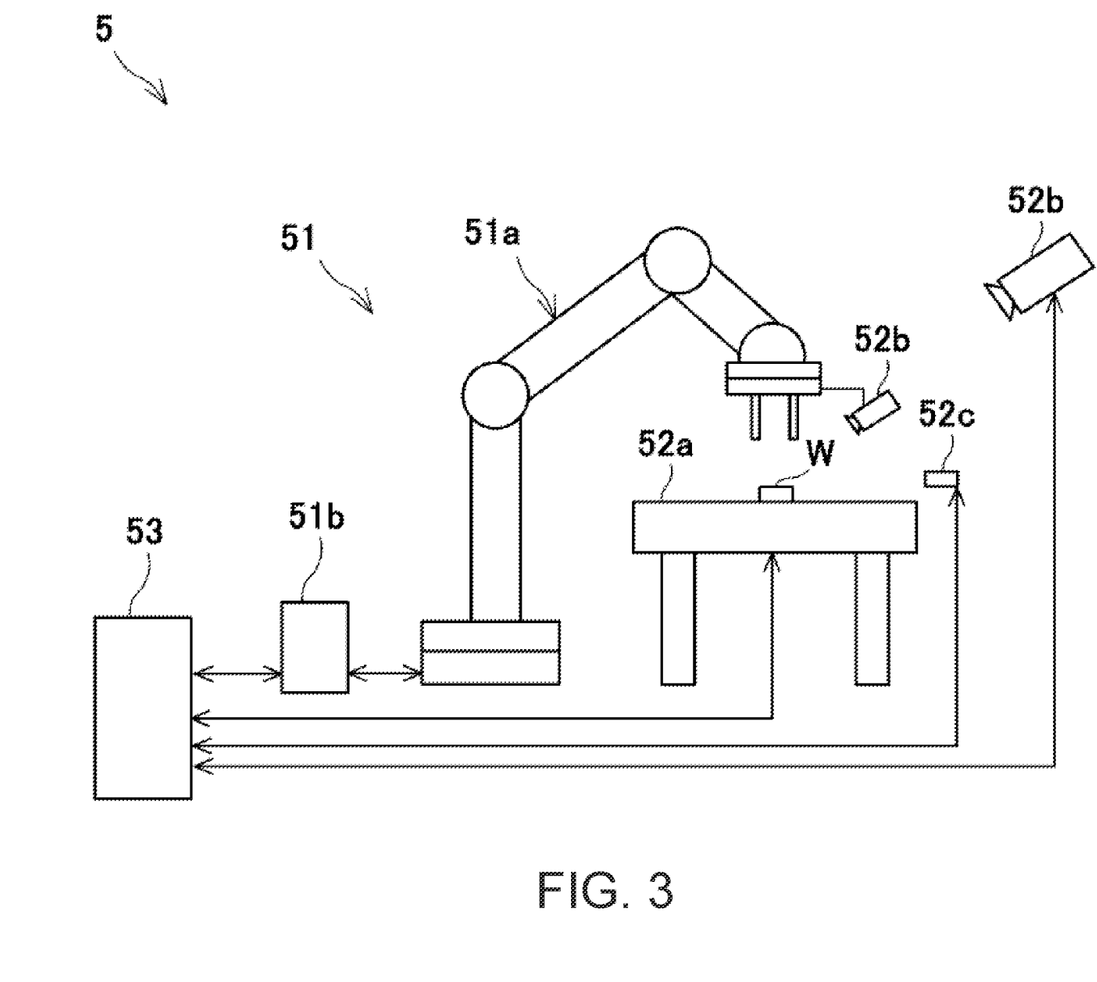
FIG. 3 is a view schematically illustrating one example of a robot system of FIG. 1.

FIG. 3 schematically illustrates one example of the robot system 5. In this robot system 5, the robot 51 picks a workpiece W transferred by a conveyor 52a. The robot 51 is an industrial robot in the robot system 5 illustrated in FIG. 3. The robot 51 includes a robot body 51a, which is a target to be remotely manipulated by the operator, and a robot controller 51b which controls motion of the robot body 51a. The robot body 51a illustrated in FIG. 3 is a vertical articulated robotic arm to which a tool is attached at a tip-end part thereof. In this example, as the tool, a gripping hand grippable of the workpiece W is attached to the tip-end part of the vertically articulated robotic arm. The robot controller 51b is provided with a processor which executes decoding, arithmetic processing, etc., of the stored program and various signals inputted from an external device, and is configured to control the motion of the robot body 51a and output signals from various output ports. Moreover, the robot system 5 of FIG. 3 is provided with, as the peripheral devices 52, the conveyor 52a which transfers the workpiece as the work target object, one or more (in this example, two) imaging devices 52b which image a working state of the robot 51, a sensor 52c which detects a position of the workpiece W, etc.

Note that the configuration of the robot system 5 illustrated in FIG. 3 is one example, and the kinds of the robot 51 and the peripheral devices 52 correspond to the work content of the robot 51. For example, the work of the robot 51 may be, other than the picking work, a painting, a dishing up in a Bento box, or a welding. Moreover, the robot 51 is not limited to the vertical articulated robot, but may be an industrial robot, such as a horizontal articulated robot, a parallel link robot, a polar coordinate robot, a cylindrical coordinate robot, and a Cartesian coordinate robot. Moreover, the transferring device as the peripheral device 52, which transfers the workpiece W which is the work target object, may be a transferring device other than the conveyor. The peripheral devices 52 may include a moving device, such as a movable base, which moves the robot body 51a. The one or more sensors as the peripheral devices 52 may be, alternative or in addition to the sensor which detects the position of the workpiece W, a sensor which detects a position and a posture of the robot 51. The one or more sensors as the peripheral devices 52 include a sensor which detects a position or an orientation of an object to be detected. Moreover, the robot system 5 may be provided with a plurality of imaging devices 52b as the peripheral devices 52. As illustrated in FIG. 3, the imaging devices 52b may be attached to the robot body 51a, or may be provided at a fixed position in the workspace.

(Functional Configuration)

Figure 4:
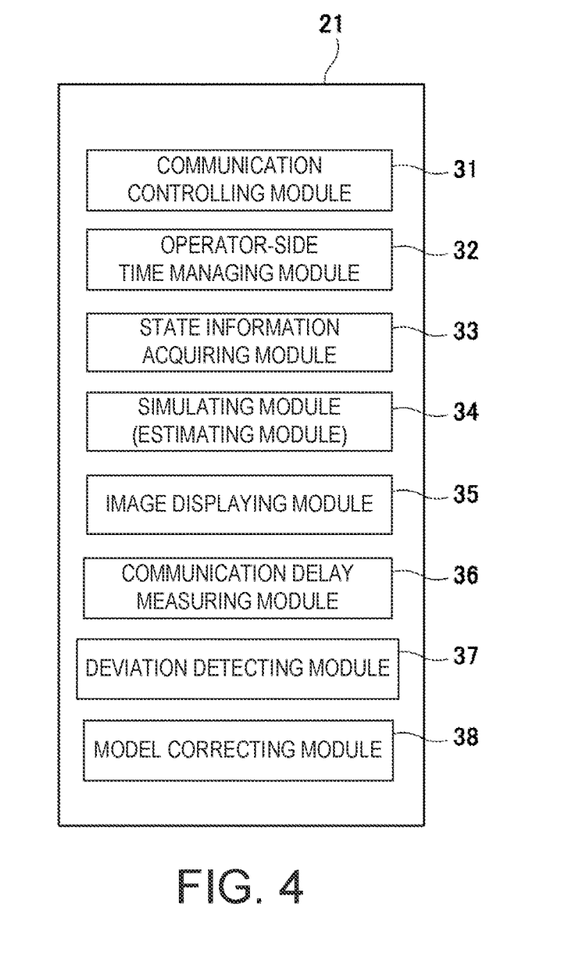
FIG. 4 is a block diagram illustrating a functional configuration of a controlling part of the game device of FIG. 1.

FIG. 4 is a block diagram illustrating a functional configuration of the controlling part 21 of the game device 2. The controlling part 21 of the game device 2 has, as the functional configuration, a communication controlling module 31, an operator-side time managing module 32, a state information acquiring module 33, a simulating module (an estimating module) 34, an image displaying module 35, a communication delay measuring module 36, a deviation detecting module 37, and a model correcting module 38. These functional parts are functionally implemented in cooperation with a given program stored in the storage device of the game device 2. Note that the given program stored in the storage device of the game device 2 includes a "data generation program" of the present disclosure.

The communication controlling module 31 controls the communication part 22 to send the operation request and the specification information described above to the intermediation device 6, and receive the list information from the intermediation device 6. Moreover, the communication controlling module 31 controls the communication part 22 to receive information from the intermediation device 6 for communicably being connected with the robot system 5 associated to the game device 2 by the intermediation device 6. Moreover, the communication controlling module 31 controls the communication part 22 to send the manipulation information generated by the operator operating the controller 28 to the relay device 53 of the corresponding robot system 5.

The operator-side time managing module 32 manages time on the game device 2 side so that a period of time from the manipulation through the controller 28 by the operator to the motion of the robot 51 based on the manipulation, is maintained to be constant.

The state information acquiring module 33 and the simulating module 34 generate at least a part of data used for the generation of the image displayed on the display device 25. In detail, a workspace model modeled after the workspace where the robot (hereinafter, referred to as an "actual robot") 51 actually exists (hereinafter, referred to as the "actual workspace"), is displayed as a video on the display device 25. The workspace model includes a robot model and peripheral object models disposed in an imaginary workspace. The robot model is modeled after the actual robot 51. The peripheral object models are modeled after given peripheral objects located around the actual robot 51 (hereinafter, referred to as "actual peripheral objects"). The actual peripheral objects include the peripheral devices 52 and the workpiece W located around the robot 51, and the peripheral object models include peripheral device models and a workpiece model corresponding thereto. For the generation of the image to be displayed on the display device 25, robot model data and peripheral-object model data are used.

The robot model data includes static information on the actual robot 51. The static information on the actual robot 51 includes, for example, structural information indicative of a structure of the actual robot 51 (e.g., the number of joints and a length of a link of the robot body 51a, and a structure of the tool), and information indicative of the position and/or the posture of the actual robot 51 before the start of the work (e.g., a rotational angle information of a servomotor provided to the robot body 51a). Moreover, the robot model data includes dynamic information of the robot model, that is, the manipulation information (command) of the operator to the controller 28. This manipulation information is used in order to move the robot model, and also in order to move the actual robot 51 by being sent from the game device 2 to the actual robot 51 via the communication network 4. That is, when the operator operates the controller 28 while watching a display screen of the display device 25 and moves the robot model on the display screen, the actual robot 51 at the worksite also moves similarly. However, as will be described later, the actual robot 51 moves having a given time lag from the motion of the robot model.

This manipulation information is used in order to move the robot model, and also in order to move the actual robot 51 by being sent from the game device 2 to the actual robot 51 via the communication network 4. That is, when the operator operates the controller 28 while watching a display screen of the display device 25 and moves the robot model on the display screen, the actual robot 51 at the worksite also moves similarly. However, as will be described later, the actual robot 51 moves having a given time lag from the motion of the robot model.

The peripheral-object model data includes static information on the actual peripheral objects. The static information on the actual peripheral objects includes structural information on the peripheral devices 52, information indicative of positions and/or postures of the peripheral devices 52 before the start of the work, shape data and structural information on the workpiece W which is the work target object of the actual robot 51, and information indicative of the position and/or the posture of the workpiece W before the start of the work. Moreover, the peripheral-object model data includes information on estimated positions and postures of the actual peripheral objects after a given period of time. This estimation is executed by the state information acquiring module 33 and the simulating module 34. In this embodiment, the game device 2 having the state information acquiring module 33 and the simulating module 34 corresponds to a "data generation device" of the present disclosure.

In detail, the state information acquiring module 33 acquires state information indicative of the states of the actual peripheral objects, such as the peripheral devices 52 and the workpiece W around the actual robot 51. Then, based on the state information, the simulating module 34 simulates changes in the positions and postures of the actual peripheral objects over time. For example, when the state information acquiring module 33 acquires, as the state information, information indicative of a transferring speed set for the transferring device (in this example, the conveyor 52a) as the peripheral device 52, and information indicative of the position of the workpiece W transferred by the transferring device at a certain time point, the simulating module 34 can easily calculate, based on the transferring speed information and the workpiece positional information, a position and a posture of the workpiece W after a given period of time. In this manner, the simulating module 34 estimates the states of the actual peripheral objects after the given time period from the current time point, through the simulation. Then, the simulating module 34 generates an estimation result as the peripheral-object model data used for the creation of the peripheral object models.

The image displaying module 35 displays on the display device 25 the workspace model created based on the robot model data and the peripheral-object model data. For example, the image displaying module 35 disposes an imaginary camera in the imaginary workspace where the robot model and the peripheral object models created based on the robot model data and the peripheral-object model data, are disposed. An image captured by this imaginary camera is displayed on the display device 25. A position, an orientation, and a zoom of the imaginary camera may be set in advance, or may be changeable according to, for example, the operation of the operator to the controller 28. The position and the orientation of the imaginary camera in the imaginary workspace may correspond to the position and the orientation of the imaging device 52b in the actual workspace.

The communication delay measuring module 36, the deviation detecting module 37, and the model correcting module 38 will be described later in detail.

Figure 5:
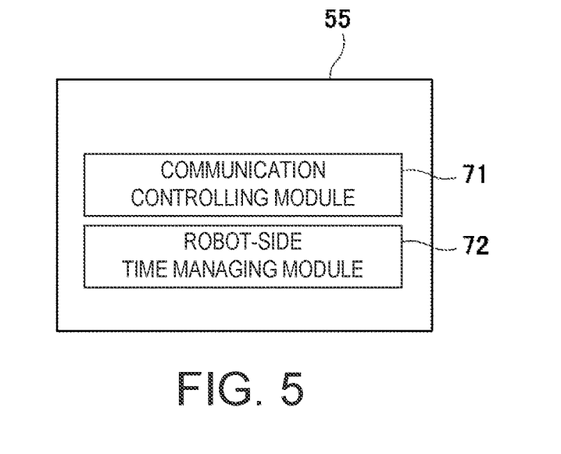
FIG. 5 is a block diagram illustrating a functional configuration of a controlling part of the relay device of FIG. 1.

FIG. 5 is a block diagram illustrating a functional configuration of the controlling part 55 of the relay device 53. The controlling part 55 of the relay device 53 has a communication controlling module 71 and a robot-side time managing module 72 as the functional configuration. These functional parts are functionally implemented in cooperation with a given program stored in the controlling part 55 and/or the storing part 57 of the relay device 53.

The communication controlling module 71 controls the communication part 56 to receive from the game device 2 the manipulation information generated by the operator operating the controller 28.

The robot-side time managing module 72 manages time on the robot system 5 side so that a period of time from the manipulation through the controller 28 by the operator to the motion of the robot 51 based on the manipulation, is maintained to be constant.

(Processing Flow)

Next, processing executed by each of the game device 2 and the relay device 53 is described with reference to FIGS. 6 to 8.

Figure 6:
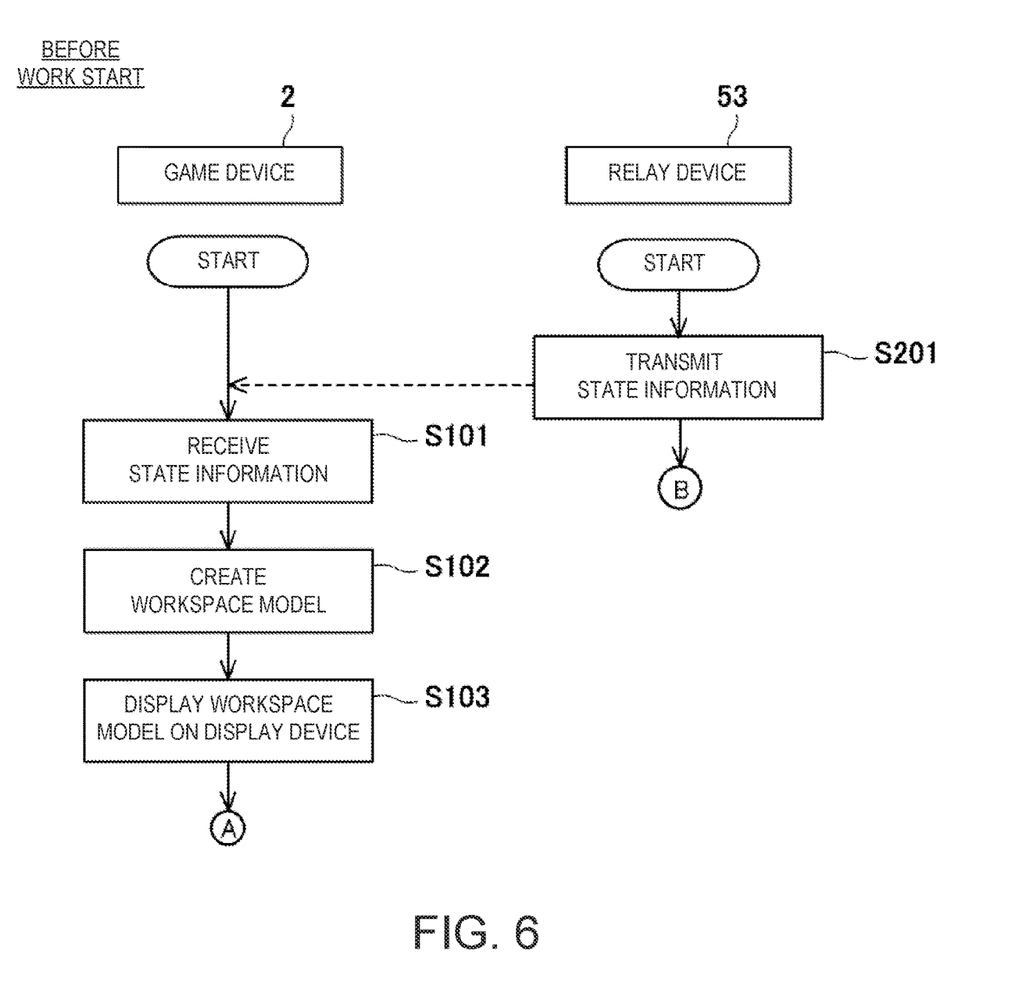
FIG. 6 is a processing flowchart of each of the game device and the relay device before the robot starts working.

FIG. 6 is a processing flowchart of each of the game device 2 and the relay device 53 before the robot 51 starts working. Before the start of the work, the robot model, the peripheral device models, and the workpiece model in the workspace model are created so as to be in the same states as the actual robot 51, the peripheral devices 52, and the workpiece W, respectively.

In detail, when the intermediation device 6 connects the game device 2 with the relay device 53, the communication controlling module 71 of the relay device 53 transmits to the game device 2 information for creating the workspace model before the start of the work (Step S201). The information for creating the workspace model before the start of the work includes the state information indicative of the states of the actual peripheral objects around the actual robot 51.

In this embodiment, the state information includes image information generated by the peripheral devices 52 and the workpiece W being imaged by the imaging device 52b installed in the actual workspace. Moreover, the state information includes detection information of the sensor as the peripheral device 52. The detection information of the sensor includes, for example, information indicating whether the workpiece W is located at a given position in the workspace, and information indicating the position or the posture of the workpiece W. Moreover, the state information includes setting information set for the peripheral devices 52. For example, when the robot system 5 includes the transferring device as the peripheral device 52, the setting information may include a transferring speed and a transferring interval set for the transferring device. The transferring interval may be a distance between the transferred workpieces W, or may be a time interval from a time point when one workpiece W is transferred to a given position in front of the robot 51, to a time point when the next workpiece W is transferred to the given position.

Moreover, the state information sent from the relay device 53 to the game device 2 at Step S201 also includes information indicative of the state of the actual robot 51. The information indicative of the state of the actual robot 51 may include, for example, the postural information and the positional information on the actual robot 51 stored in the robot controller 51b. Moreover, the information indicative of the state of the actual robot 51 may include the image information acquired by the imaging device 52b which is the peripheral device 52, and the detection information of the sensor 52c.

On the game device 2 side, the state information acquiring module 33 acquires the state information received from the relay device 53 (Step S101). Then, the simulating module 34 creates the workspace model in the same state as the actual workspace before the start of the work, based on the state information acquired by the state information acquiring module 33 (Step S102). The state information includes, for example, the shape data and the structural information on the workpiece W, the position and orientation of the workpiece W, and the positional information, the structural information and the setting information on the peripheral devices 52.

In detail, the simulating module 34 creates the robot model based on the positional information (positional coordinates in a coordinate system set for the actual workspace) and the postural information (e.g., the rotational angle information of the servomotor provided to the robot body 51a) on the actual robot 51 before the start of the work, so that the state (e.g., the position and posture) of the robot model becomes the same as that of the actual robot 51. Moreover, the simulating module 34 creates the peripheral object models based on the state information on the actual peripheral objects before the start of the work, so that the peripheral object models become the same state as the actual peripheral objects.

The image displaying module 35 generates the image of the workspace model created at Step S102, and displays it on the display device 25 (Step S103). Accordingly, the work becomes ready to be started.

Figure 7:
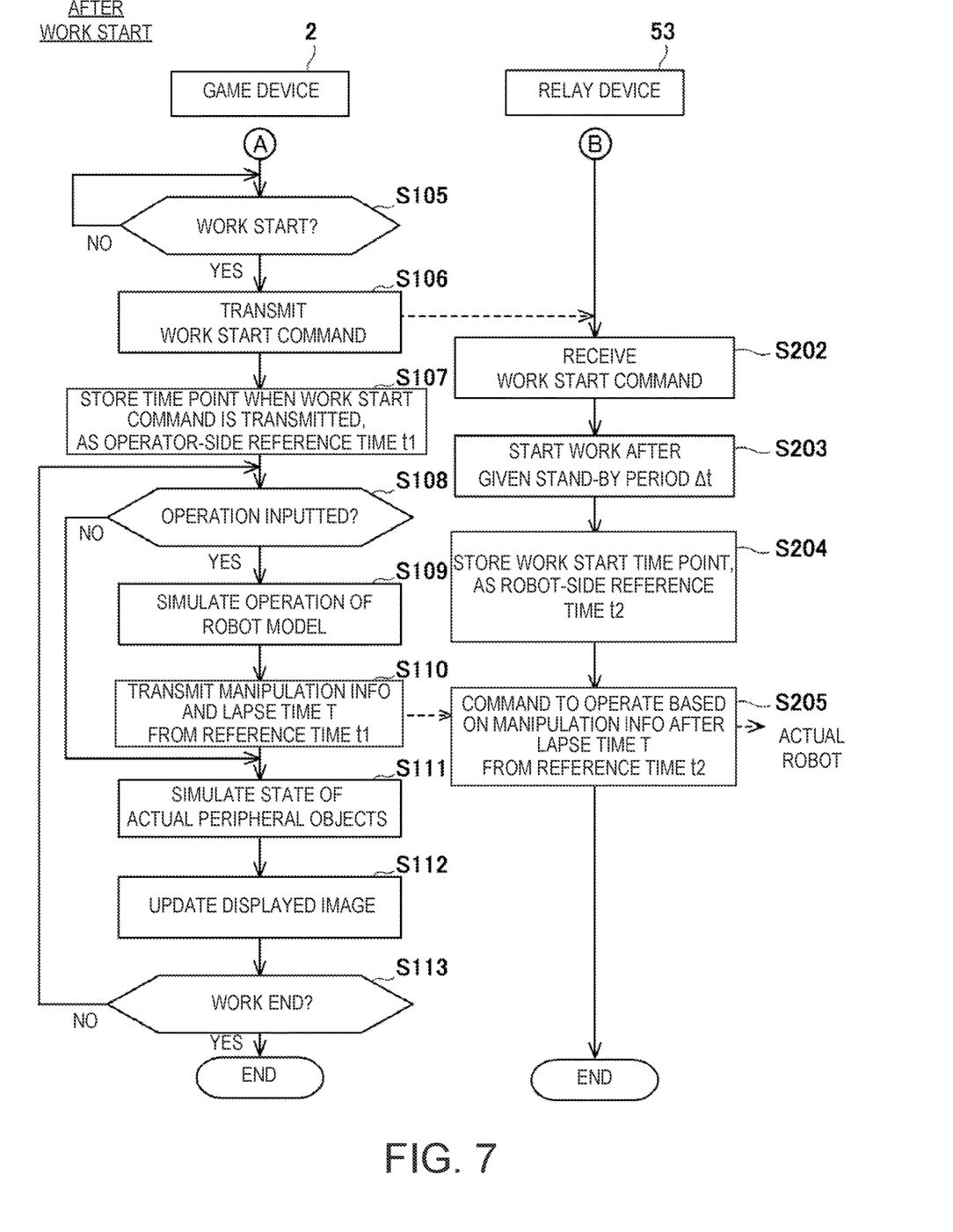
FIG. 7 is a processing flowchart of each of the game device and the relay device after the robot starts working.
Figure 8:
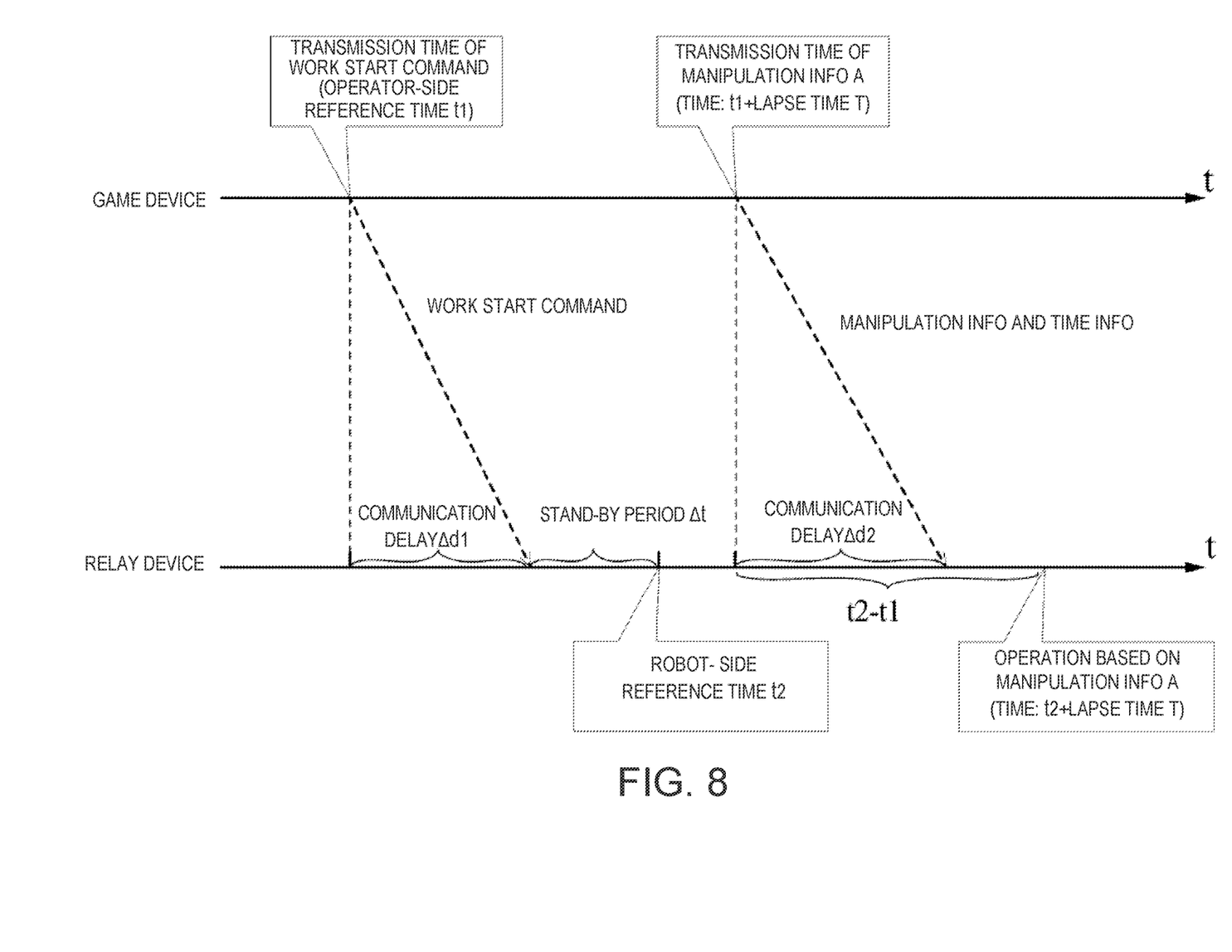
FIG. 8 is a view illustrating one example of processing executed by each of the game device and the relay device over time.

FIG. 7 is a processing flowchart of each of the game device 2 and the relay device 53 after the robot 51 starts working. FIG. 8 is a view illustrating one example of processing executed by each of the game device 2 and the relay device 53 over time.

After Step S103, the controlling part 21 of the game device 2 determines whether operation to command the start of the work is carried out (Step S105). If the start of the work is not commanded (Step S105: NO), the controlling part 21 of the game device 2 becomes a stand-by state until the start of the work is commanded. If the operator operates the controller 28 to command the start of the work (Step S105: YES), the communication controlling module 31 transmits the work start command to the relay device 53 (Step S106). Moreover, the operator-side time managing module 32 stores, in the storage device of the game device 2 (e.g., the RAM 212 or the storing part 23), a time point when the work start command is transmitted, as an operator-side reference time t1 (Step S107, also see FIG. 8).

On the robot system 5 side, when the communication controlling module 71 of the relay device 53 receives the work start command (Step S202), the communication controlling module 71 sets, as a work start time, a time point after a given stand-by period Δt from the receiving timing of the work start command, and sends the work start command to the robot 51 and the peripheral devices 52 (Step S203). Moreover, the robot-side time managing module 72 stores the time point after the given stand-by period Δt from the receiving timing of the work start command, as a robot-side reference time t2 (Step S204, also see FIG. 8).

In this manner, as will be described later, while the robot model starts working from the operator-side reference time t1 in the workspace model displayed on the display device 25, the actual robot starts working from the robot-side reference time t2 in the actual workspace. In other words, the work in the actual workspace progresses having a time lag from the work in the workspace model, by a difference between the reference times (t2−t1). For example, the work start command sent from the game device 2 to the robot system 5 may include a command to change a state of the peripheral device 52 from a suspended state to an active state. For example, the workpiece model in the workspace model may be started to be transferred by a transferring device model at the operator-side reference time t1, and the actual workpiece W in the actual workspace may be started to be transferred by the transferring device at the robot-side reference time t2.

In the game device 2, after the reference time t1 is set at Step S107, the remote manipulation of the robot 51 is enabled. That is, if the operation for manipulating the robot 51 is performed to the controller 28 (Step S108: YES), the manipulation information is generated. The simulating module 34 simulates the operation of the robot model based on the manipulation information (Step S109). Moreover, the communication controlling module 31 transmits to the relay device 53 the manipulation information as well as a lapse time T from the reference time t1, which indicates a period of time lapsed before the manipulation corresponding to the manipulation information is performed (Step S110).

On the robot system 5 side, when the communication controlling module 71 of the relay device 53 receives from the game device 2 the manipulation information and the time information as a set, it sends an operation command to the robot 51 so that the robot 51 performs the operation based on the received manipulation information after the lapse time T from the reference time t2 (Step S205). Note that at Step S110, instead of the lapse time T, time information indicative of time when the manipulation corresponding to the manipulation information is performed (e.g., time-point information indicative of the time point of manipulation) may be transmitted.

Moreover, the simulating module 34 simulates the states of the actual peripheral objects regardless of whether the manipulation is determined to be performed at Step S108 (Step S111). In detail, the simulating module 34 estimates, based on the state information, the states of the actual peripheral objects after the given time period from the current time point, and generates the estimated result as the peripheral-object model data used for the creation of the peripheral object models. Note that the state information may not be the one acquired by the state information acquiring module 33 at Step S101 before the start of the work, but may be information acquired after the start of the work. That is, the latest state information may be sequentially sent from the robot system 5 to the game device 2, and the state information acquiring module 33 may sequentially acquire the latest state information. The simulating module 34 may estimate the states of the actual peripheral objects based on the latest state information.

The image displaying module 35 displays on the display device 25 the image indicating the workspace model, based on the data generated based on the simulation result at Steps S109 and S111 (Step S112). The image displaying module 35 displays the workspace model in a situation posterior to the situation in the actual workspace, by the difference between the robot-side reference time t2 and the operator-side reference time t1 (t2−t1). In other words, as illustrated in FIG. 8, the work in the actual workspace progresses having the time lag from the work in the workspace model displayed on the display device 25, by the difference between the robot-side reference time t2 and the operator-side reference time t1 (t2−t1).

Steps S108 to S112 are repeated until the controller 28 is operated to finish the work, or the given work is finished (Step S113: NO).

At Step S203 described above, the robot-side time managing module 72 sets the robot-side reference time t2 to the time point after the given stand-by period Δt from the receiving timing of the work start command, but not at the receiving timing of the work start command. By such a certain time interval being provided between the operator-side reference time t1 and the robot-side reference time t2, fluctuation in the communication delay between the game device 2 and the robot system 5 (see Δd1 and Δd2 in FIG. 8) is absorbed.

Note that the stand-by period Δt may be set based on the actual communication delay between the game device 2 and the robot system 5 (in detail, the relay device 53). The communication delay measuring module 36 measures the communication delay between the game device 2 and the robot system 5 (in detail, the relay device 53) associated thereto. The measurement of the communication delay is executed in a well-known method. Before Step S105, the robot-side time managing module 72 may set the length of the stand-by period Δt, in other words, the difference between the robot-side reference time t2 and the operator-side reference time t1 (t2−t1) according to an amount of fluctuation in the communication delay measured by the communication delay measuring module 36.

Moreover, in this embodiment, the workspace model is periodically corrected while Steps S108 to S112 are repeated. The deviation detecting module 37 detects the amount of deviation between the situation in the workspace model displayed on the display device 25 at a given time point, and the situation in the actual workspace after the given time period from the given time point. In more detail, the deviation detecting module 37 detects the amount of deviation between the situation in the workspace model at the given time point, and the situation in the actual workspace posterior to the given time point, by the difference between the robot-side reference time t2 and the operator-side reference time t1 (t2−t1).

For example, the deviation detecting module 37 may detect the amount of deviation by comparing the state information indicative of the state in the actual workspace at a certain time point "ta," and the state in the workspace model at the time point ta, which is estimated by the simulating module 34 based on the state information acquired before the time point ta. The state information indicative of the state in the actual workspace to be compared by the deviation detecting module 37 may include the state information used by the simulating module 34 for estimating the states of the actual peripheral objects. For example, the deviation detecting module 37 may receive from the robot system 5 the image information of the actual workspace at the time point ta, and determine, based on the image information, the positions and postures of the actual peripheral objects (the peripheral devices 52 and the workpiece W) by an image recognition. The deviation detecting module 37 compares the positions and postures of the actual peripheral objects determined based on the image information at the time point ta, and the positions and postures of the peripheral object models in the workspace model at a time point corresponding to the time point ta in the actual workspace (i.e., at a time point (ta−(t2−t1))). That is, the deviation detecting module 37 compares the states of the actual peripheral objects determined based on the image information at the time point ta (the positions and postures of the peripheral devices 52 and the workpiece W), and the states of the peripheral object models prior to the time point ta by the time period (t2−t1).

Then, when the deviation detected by the deviation detecting module 37 exceeds a range set in advance, the model correcting module 38 corrects the workspace model so as to eliminate the deviation. For example, the model correcting module 38 may adjust the state information used by the simulating module 34, by the amount of deviation detected by the deviation detecting module 37. Alternatively, the model correcting module 38 may adjust the peripheral-object model data generated by the simulating module 34 by the amount of deviation detected by the deviation detecting module 37. Note that when the simulating module 34 simulates the states of the actual peripheral objects after the model correcting module 38 corrects the workspace model, the states of the actual peripheral objects are simulated in consideration of the correction of the workspace model.

As described above, according to the game device 2 as the data generation device and the remote manipulation system 1 of this embodiment, the states of the actual peripheral objects after the given time period from the current time point are estimated, and the estimated result is generated as the peripheral-object model data used for creating the peripheral object models displayed on the display device 25. Therefore, the time lag can also be generated between the states of the peripheral object models and the states of the actual peripheral objects, by the same amount as between the robot model and the actual robot. Accordingly, since a time axis of the robot model can be consistent with a time axis of the peripheral object models, the influence of the communication delay given to the manipulation of the operator can be reduced.

Moreover, in this embodiment, the deviation detecting module 37 detects the amount of deviation between the situation in the workspace model displayed on the display device 25 at the given time point, and the situation in the actual workspace after the given time period from the given time point, and when the deviation detected by the deviation detecting module 37 exceeds the range set in advance, the model correcting module 38 corrects the workspace model to eliminate the deviation. Therefore, the deviation between the situation in the workspace model displayed on the display device 25 and the situation in the actual workspace can be reduced.

Other Embodiments

The present disclosure is not limited to the embodiment described above, but may be changed variously without departing from the spirit of the present disclosure.

For example, although in the embodiment described above, the game device 2 is illustrated as the manipulation terminal, the manipulation terminal in the present disclosure may not be the game device 2. The manipulation terminal may be any device, as long as it has a manipulator which accepts the operation of the operator, and a display unit which can be visually recognized by the operator. For example, the game device 2 may be, other than various known game devices, any of a personal data assistant (PDA), a smartphone, a personal computer, a tablet, and a remote manipulator dedicated for the robot.

Moreover, for example, the controlling part of the intermediation device 6 or another server device may execute a given program so as to function as the state information acquiring module and the estimating module. That is, the "data generation device" of the present disclosure may not be the manipulation terminal operated by the operator, but may be a device which communicates with the manipulation terminal. For example, the data generation device of the present disclosure may be the robot controller 51b, the relay device 53, the intermediation device 6, or a server device other than the intermediation device 6. The data generation device of the present disclosure may not be provided with some or all of the communication delay measuring module 36, the deviation detecting module 37, and the model correcting module 38.

Moreover, the "data generation program" of the present disclosure may be stored in, alternative or in addition to the storage device of the game device 2 as the manipulation terminal, a storage device provided to at least one of the robot controller 51b, the relay device 53, the intermediation device 6, and a server device other than the intermediation device 6. Moreover, the "data generation program" of the present disclosure may be any program, as long as it is executed by a computer built in at least one of the robot controller 51b, the relay device 53, the intermediation device 6, and a server device other than the intermediation device 6 so that the computer functions as the state information acquiring module and the estimating module. The processing flows of the game device 2 and the relay device 53 described with reference to FIGS. 6 and 7 also do not limit the present disclosure.

Moreover, the remote manipulation system 1 may be provided with only one game device 2, and may be provided with only one robot system 5.

The remote manipulation system 1 may not be provided with the intermediation device 6. Furthermore, the relay device 53 and the robot controller 51b of the robot system 5 may be integrally constituted. That is, the robot system 5 may be provided with a single control device which functions as both of the relay device 53 and the robot controller 51b.

Moreover, the actual robot in the present disclosure may not be the industrial robot, but may be any robot as long as it operates according to the operation of the operator to the manipulation terminal. For example, the actual robot of the present disclosure may be a service robot which provides a service, such as nursing, medical treatment, transferring, cleaning, and cooking. Moreover, the actual robot of the present disclosure may be a humanoid. Although the actual robot operates based on the manipulation information generated based on the operation of the operator to the manipulator, the actual robot may operate based on a task program set in advance as well as the manipulation information.

In this embodiment, the data generation program causes the controlling part 21 of the game device 2 as the manipulation terminal to execute a state information acquiring step in which the state information indicative of the states of the actual peripheral objects are acquired, and an estimating step in which the states of the actual peripheral objects after the current time point are estimated, and the estimation result is generated as the peripheral-object model data used for the creation of the peripheral object models displayed on the display unit. However, the data generation program of the present disclosure may cause another computer to execute the state information acquiring step and the estimating step. For example, the data generation program of the present disclosure may cause a control device (a computer) provided to at least one of the robot controller 51b, the relay device 53, the intermediation device 6, and a server device other than the intermediation device 6, to execute the state information acquiring step and the estimating step. The data generation program may be stored distributedly in a plurality of storage devices. For example, a part of the data generation program may be stored in the storage device of the manipulation terminal, and the other part may be stored in a storage device different from the manipulation terminal (e.g., the relay device 53). Moreover, the data generation program of the present disclosure may cause the computer to execute a deviation detecting step in which the amount of deviation between the situation in the workspace model displayed on the display unit at the given time point, and the situation in the actual workspace after the given time period from the given time point, is detected. Moreover, the data generation program of the present disclosure may cause the computer to execute a model correcting step in which, when the deviation detected in the deviation detecting step exceeds the range set in advance, the workspace model is corrected so as to eliminate the deviation.

DESCRIPTION OF REFERENCE CHARACTERS

1: Remote Manipulation System
2: Game Device (Manipulation Terminal)
4: Communication Network
5: Robot System
6: Intermediation Device
25: Display Device (Display Unit)
28: Controller (Manipulator)
33: State Information Acquiring Module
34: Simulating Module (Estimating Module)
35: Image Displaying Module
36: Communication Delay Measuring Module
37: Deviation Detecting Module
38: Model Correcting Module
51: Robot
51a: Robot Body
51b: Robot Controller
52: Peripheral Device
52a: Conveyor
52b: Imaging Device
52c: Sensor
53: Relay Device
55: Controlling Part

What is claimed is:

1. A data generation device configured to generate, in a remote manipulation system including a manipulation terminal having a manipulator configured to accept operation of an operator and a display unit visually recognizable by the operator, and an actual robot placed in an actual workspace and connected with the manipulation terminal through a network in which data communication is possible, at least a part of data used for a generation of an image displayed on the display unit,
    wherein the display unit displays a workspace model modeled after the actual workspace, as a video,
    wherein the workspace model includes a robot model modeled after the actual robot, and a peripheral object model modeled after an actual peripheral object, which is moving, around the actual robot, and
    wherein the robot model is created so as to operate according to the operation of the operator to the manipulator,
    the data generation device comprising:
        a state information acquiring module configured to acquire state information indicative of a state of the actual peripheral object; and
        an estimating module configured to
            estimate, based on the state information, a state of the actual peripheral object after a given period of time from the current time point, the given time period corresponding to a difference between a first time at which the manipulation terminal transmits a work start command to control operation of the actual robot and a second time at which the actual robot begins working in response to the work start command,
            generate a result of the estimation as peripheral-object model data used for a creation of the peripheral object model displayed on the display unit; and
            continue to estimate the state of the actual peripheral object based on a latest difference between the first time and the second time after the manipulation terminal stops transmitting the work start command.

2. The data generation device of claim 1, wherein the actual peripheral object includes at least one of a workpiece that is a work target object of the actual robot, a transferring device configured to transfer the workpiece, and a moving device configured to move the actual robot.

3. The data generation device of claim 1, wherein the state information includes image information generated by an imaging device installed in the workspace capturing the actual peripheral object.

4. The data generation device of claim 1, wherein the state information includes setting information set for a peripheral device as the peripheral object.

5. The data generation device of claim 1, further comprising a deviation detecting module configured to detect an amount of deviation between a situation in the workspace model displayed on the display unit at a given time point, and a situation in the actual workspace after the given period of time from the given time point.

6. The data generation device of claim 5, further comprising a model correcting module configured to correct the workspace model so as to eliminate the deviation, when the deviation detected by the deviation detecting module exceeds a range set in advance.

7. The data generation device of claim 1, wherein the manipulation terminal is a game device including a controller as the manipulator.

8. The data generation device of claim 1, wherein the manipulation terminal is at least one of a personal data assistant (PDA), a smartphone, a personal computer, a tablet, and a remote manipulator dedicated for a robot.

9. The data generation device of claim 1, wherein
    the second time is set to a time point after a stand-by period from a time at which the work start command is received by a relay device that enables communication between the actual robot and the manipulation terminal to absorb a fluctuation in a communication delay between the manipulation terminal and a robot system including the actual robot.

10. A method of generating data for generating, in a remote manipulation system including a manipulation terminal having a manipulator configured to accept operation of an operator and a display unit visually recognizable by the operator, and an actual robot placed in an actual workspace and connected with the manipulation terminal through a network in which data communication is possible, at least a part of data used for a generation of an image displayed on the display unit,
    wherein the display unit displays a workspace model modeled after the actual workspace, as a video,
    wherein the workspace model includes a robot model modeled after the actual robot, and a peripheral object model modeled after an actual peripheral object, which is moving, around the actual robot, and
    wherein the robot model is created so as to operate according to the operation of the operator to the manipulator,
    the method comprising the steps of:

acquiring state information indicative of a state of the actual peripheral object;

estimating, based on the state information, a state of the actual peripheral object after a given period of time from the current time point, the given time period corresponding to a difference between a first time at which the manipulation terminal transmits a work start command to control operation of the actual robot and a second time at which the actual robot begins working in response to the work start command;

generating a result of the estimation as peripheral-object model data used for a creation of the peripheral object model displayed on the display unit; and continuing to estimate the state of the actual peripheral object based on a latest difference between the first time and the second time after the manipulation terminal stops transmitting the work start command.

11. The method of claim 10, wherein the second time is set to a time point after a stand-by period from a time at which the work start command is received by a relay device that enables communication between the actual robot and the manipulation terminal to absorb a fluctuation in a communication delay between the manipulation terminal and a robot system including the actual robot.

12. A remote manipulation system including a manipulation terminal having a manipulator configured to accept operation of an operator and a display unit visually recognizable by the operator, and an actual robot placed in an actual workspace and connected with the manipulation terminal through a network in which data communication is possible, wherein the display unit displays a workspace model modeled after the actual workspace, as a video, wherein the workspace model includes a robot model modeled after the actual robot, and a peripheral object model modeled after an actual peripheral object, which is moving, around the actual robot, and wherein the robot model is created so as to operate according to the operation of the operator to the manipulator, the system comprising a data generation device including:

a state information acquiring module configured to acquire state information indicative of a state of the actual peripheral object; and an estimating module configured to estimate, based on the state information, a state of the actual peripheral object after a given period of time from the current time point, the given time period corresponding to a difference between a first time at which the manipulation terminal transmits a work start command to control operation of the actual robot and a second time at which the actual robot begins working in response to the work start command, generate a result of the estimation as peripheral-object model data used for a creation of the peripheral object model displayed on the display unit, and continue to estimate the state of the actual peripheral object based on a latest difference between the first time and the second time after the manipulation terminal stops transmitting the work start command.

13. The remote manipulation system of claim 12, wherein the second time is set to a time point after a stand-by period from a time at which the work start command is received by a relay device that enables communication between the actual robot and the manipulation terminal to absorb a fluctuation in a communication delay between the manipulation terminal and a robot system including the actual robot.

\* \* \* \* \*